United States Patent [19]

Limpel et al.

[11] 3,901,683
[45] Aug. 26, 1975

[54] CROP YIELDS WITH KETOXIMES
[75] Inventors: Lawrence E. Limpel, Yonkers, N.Y.; Joseph A. Ignatoski, Mentor, Ohio
[73] Assignee: Diamond Shamrock Corporation, Cleveland, Ohio
[22] Filed: July 23, 1973
[21] Appl. No.: 381,739

[52] U.S. Cl. ............... 71/98; 71/103; 424/327; 260/566 AC; 260/566 AE; 47/57.6
[51] Int. Cl.² ............................................ A01N 9/12
[58] Field of Search ........ 71/98, 103; 424/327, 298, 424/315; 260/566 AC, 566 AE

[56] References Cited
UNITED STATES PATENTS

| | | | |
|---|---|---|---|
| 3,124,447 | 3/1964 | Wineman et al. | 71/103 |
| 3,462,490 | 8/1969 | Payne, Jr. et al. | 424/327 |
| 3,514,516 | 5/1970 | Summers | 71/77 |
| 3,720,772 | 3/1973 | Fridinger et al. | 424/327 |

FOREIGN PATENTS OR APPLICATIONS

| | | | |
|---|---|---|---|
| 2,216,838 | 4/1972 | Germany | 260/566 AC |

OTHER PUBLICATIONS

Payne, Jr. et al., "The Synthesis & Insecticidal Properties, etc.," (1966). J. Agr. Food Chem. 14, pp. 356–365 (1966).

*Primary Examiner*—Glennon H. Hollrah
*Attorney, Agent, or Firm*—Timothy E. Tinkler

[57] ABSTRACT

Disclosed is a method of reducing insect damage and improving crop yield, which method comprises treating seeds of the crop in question with 3,3-dimethyl-1-methylthio-2-butanone 0-methylcarbamoyloxime and/or the sulfoxide or sulfone thereof. Particularly disclosed are cotton seeds so treated.

7 Claims, No Drawings

CROP YIELDS WITH KETOXIMES

BACKGROUND OF THE INVENTION

Through the years, a great number of compounds have been proposed for use as insecticides. Of particular interest to the agricultural industry are the systemic insecticides, i.e., those capable of reducing or preventing plant damage from insects by absorption through the roots and translocation into the plant tissue without imparting an undesirable phytotoxic effect. While systemic insecticides constitute a small proportion of the total number of known insecticides, there still exists a large number of compounds known to have this utility.

Within this class of systemic insecticides useful for agricultural purposes, there have been found a still more limited number of compounds having the further distinguishing characteristic of being effective when employed as a seed treatment, i.e., application of the insecticide to the seeds prior to planting protects both the seeds and the emerging seedlings from insect attack. By far the majority of systemic insecticides do not fit this seed treatment classification since they are too phytotoxic to the sensitive seeds and seedlings and/or insufficiently effective as insecticides when applied in this manner.

STATEMENT OF THE INVENTION

Therefore, it is an object of the present invention to provide a process for the protection of crops by treatment of the seeds thereof with insecticide.

It is a further object of the present invention to provide a process of insecticidal seed treatment which improves crop yield.

It is a still further object of the present invention to provide a crop seed pretreated with a systemic insecticide.

These and further objects of the present invention will become apparent to those skilled in the art from the specification and claims that follow.

There has now been found a method for reducing insect damage to seeds and seedlings and improving crop yield, which method comprises treating seeds of said crop before planting with an insecticidally effective, yield improving, amount of at least one of the compounds 3,3-dimethyl-1-methylthio-2-butanone O-methylcarbamoyloxime and the sulfoxide and sulfone thereof.

A number of advantages follow the practice of the present invention. Of primary significance is the protection of the seed and emerging seedling. The specific insecticides employed have been found to have a particularly long-term protective effect on the growing plant. So long-term is the effect in fact that several postemergent spray applications may be avoided, an obvious labor saving advantage. Such a method of application allows the farmer to obtain crop protection using approximately one-fifth the amount of insecticide necessary if employed in the conventional manner by application to the soil and/or plant. In addition, treatment of the seed, which may be accomplished well before planting and in controlled surroundings, is far safer than a spray application of larger amounts of toxic material in the field. An unexpected and important advantage is the improved crop yield noted, beyond that attributable merely to insect control.

DESCRIPTION OF THE PREFERRED EMBODIMENTS

As stated, the insecticides useful in the practice of the present invention are 3,3-dimethyl-1-methylthio-2-butanone O-methylcarbamoyloxime:

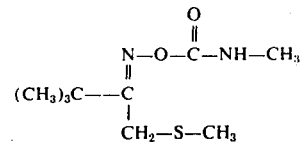

the sulfoxide thereof, 3,3-dimethyl-1-methylsulfinyl-2-butanone O-methylcarbamoyloxime:

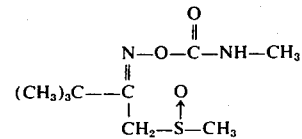

and the sulfone thereof, 3,3-dimethyl-1-methylsulfonyl-2-butanone O-methylcarbamoyloxime:

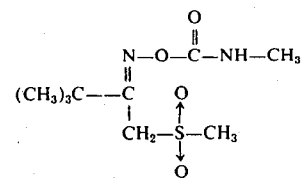

These compounds may be used alone or in combination. In practice, since its preparation involves fewer steps, the first-mentioned (methylthio) compound will be used. Within the plant, this compound is believed at least partially oxidized to the sulfoxide and sulfone, which provide a desired insecticidal effect. An exemplary preparation of 3,3-dimethyl-1-methylthio-2-butanone O-methylcarbamoyloxime is shown in Example 1 hereinbelow. The sulfoxide and sulfone derivatives can then be prepared by oxidation with sodium meta-periodate or acidic hydrogen peroxide, respectively.

The term "crop seeds" is intended to refer to the seeds of a variety of crops such as sorghum, sugar beet, rice, soybean, peanuts, Southern peas, wheat, oats, sunflowers, potato seed pieces, and, especially, cotton. Cotton seed treatment is of particular importance in view of its economic significance, its susceptibility to insect attack during the early stages of growth, and the particularly effective results shown hereinafter.

The method of application of the insecticide to the seed is not considered material so long as said seed is not unnecessarily injured. A convenient method of application is by dissolution in a volatile solvent therefor, followed by spraying or in some other manner contacting the seed therewith, and evaporation. The solvent chosen should be one that is not phytotoxic to the seed, will not cause premature germination, and, preferably, will evaporate under normal conditions within 30 minutes of application to the seed. Such solvents include dimethylformamide, cyclohexanone, methylene chloride, ethylenedichloride, trichloroethylene, and mixtures thereof. If desired, a dye may be incorporated in the insecticide/solvent mixture to identify seeds that have been treated with the toxic material. Generally, the amount of insecticide incorporated in the solvent will be within the range of from 10 to 60 percent by weight, with amounts of the order of 40 percent being particularly preferred at this time. The amount of insecticide applied is that necessary to impart an insecticidal and yield improving effect without substantial phytotoxicity. Depending upon the nature of the seed and the extent of protection desired, this amount will vary within the range of from 0.01 to 5 percent by weight of active ingredient on a seed basis. More preferably, to avoid phytotoxicity and in view of the effectiveness of the particular insecticides involved, a range on the order of from 0.125 to 1.0 percent by weight, or from 0.125 to 1.0 pounds per hundred-weight of seed, is preferred.

It should be understood that, while the most convenient manner of operation will generally involve application of the insecticide at some time prior to planting, it is possible and contemplated that the treatment may be made in the field, so long as it is a true seed treatment and not merely an in-furrow or soil drench application. It should further be recognized that, while a solution of insecticide in solvent is most readily and conveniently applied, dispersions, emulsions, suspensions, wettable powders, and the like, may also be applied, so long as the insecticide adheres and is appropriately absorbed and translocated during seedling growth.

It will be appreciated that the term "insect" is used loosely to encompass a variety of pests detrimental to the crops in question, including true insects, acarina, and the like, such as mites, thrips, aphids, leafhoppers, beetles, and others.

As mentioned hereinabove, it has been noted that seeds treated according to the present invention, and the resultant seedlings, are not only protected against insect attack but also exhibit a yield increase above and beyond that attributable to the protective effect. Plants from seeds so treated appear fuller of leaf and bud and, in general, healthier than untreated stands or those treated with competitive seed treatment insecticides. Evidence of this effect appears in the second example hereinbelow wherein the degree of insect control with seeds treated according to the present invention and those treated with a competitive commercial product are essentially the same while the yield from the seeds treated with 3,3-dimethyl-1-methylthio-2-butanone O-methylcarbamoyloxime is significantly higher. This is so even though fewer plants per acre may result from seeds according to the instant invention, thus indicating that percent germination is not necessarily a reliable guide to the more economically significant factor of crop yield.

Other pesticidal treatments may also be applied to the seeds at the same time so long as the chemicals are compatible. Thus, most of the known seed treatment fungicides may be used in combination with the instant insecticides, as may other insecticides to achieve a specific effect.

In order that those skilled in the art may more readily understand the present invention and certain preferred embodiments by which it may be carried into effect, the following specific examples are afforded.

EXAMPLE 1

To a solution of sodium ethoxide prepared from 7.7 g (0.33 m) of sodium metal and 200 ml of absolute ethanol is added 19 g (0.4 m) of methane thiol over 10 minutes at 0 ±2° C. To this solution of sodium thiomethoxide is added, dropwise, over 25 minutes, 59 g (0.28 m) of 1-bromo-3,3-dimethyl-2-butanone prepared according to the procedure of J. Am. Chem. Soc., 74, p 4507 (1952). The temperature is maintained at 0 ±3° during the addition and for a further 30 minutes. The reaction mixture is filtered and the solvent removed by vacuum distillation.

A solution of 20.4 g (0.14 m) of the resultant 3,3-dimethyl-1-methylthio-2-butanone, 19.6 g (0.28 m) of hydroxylamine hydrochloride, and 14.8 g (0.14 m) of anhydrous sodium carbonate in 140 ml of 95% ethanol and 80 ml of water is heated at reflux for 16 hours. The resulting nearly colorless solution is stripped of volatiles on a rotary evaporator to yield a two-layered liquid residue. This is extracted with four portions of ethyl acetate. The organic extract is then dried over magnesium sulfate, filtered from the drying agent, and stripped of solvent.

A solution of 110 g (0.68 m) of the resultant 3,3-dimethyl-1-methylthio-2-butanone oxime, 142.8 g (0.75 m) of methyl isocyanate, and three drops of triethylamine in 400 ml of anhydrous acetone is heated at reflux for 16 hours. Volatiles are removed by stripping on a rotary evaporator to give 155 g of white solid residue, m. 50°–53°. A solution of 25 g of this in 200 ml of ether is washed with two 100 ml portions of water. The dried ether solution is reduced in volume to yield 12.6 g of 3,3-dimethyl-1-methylthio-2-butanone O-methylcarbamoyloxime in the form of white crystals having a melting point of 56.5°–57.5°. Calc'd. for $C_9H_{18}N_2O_2S$: C, 49.5; H, 8.3; N, 13.0. Found: C, 49.3; H, 8.9; N, 12.9.

EXAMPLE 2

Three separate plots of cotton are planted in the same location employing Stoneville 213 mechanically delinted cotton seed at a rate of 20 pounds per acre, treated or not as follows. Plot A employs untreated seed as a check. Plot B employs 0.5 lb, per hundred of seed, of the commercial seed treatment insecticide O,-O-diethyl-S-2-(ethylthio)ethyl phosphorodithioate, applied to the seeds, while tumbling, as a 10% by weight solution in methylene chloride. Plot C employs 3,3-dimethyl-1-methylthio-2-butanone O-methylcarbamoyloxime at the same rate, again by spray of a 10% methylene chloride spray solution, subsequently evaporated. Results appear in Table 1.

TABLE 1

| Plot | Thrips/Acre | % Control | Plants/Acre | Crop Yield (lbs/A) | Yield Increase % |
|---|---|---|---|---|---|
| A | 165,317 | 0 | 43,730 | 1626 | — |
| B | 44,002 | 73 | 44,575 | 1752 | 7.8 |
| C | 46,095 | 72 | 41,768 | 1867 | 14.8 |

From Table 1 it is evident that substantial insect control is obtained and that, at the same rate of insect control as the commercial product and despite a lower crop stand, a significant yield increase is possible with seeds treated according to the invention.

EXAMPLE 3

Acid delinted cotton, mechanically delinted cotton, sugar beet, and sorghum seeds are treated with 3,3-dimethyl-1-methylthio-2-butanone O-methylcarbamoyloxime at the rates indicated in Table 2 (10% in methylene chloride). Germination 15 days after planting is measured as reported. Insecticidal activity on cotton is determined by excising leaves at the indicated time intervals and infesting same with two-spotted spider mites in a ventilated container. Five days after infestation, mortality counts are taken.

TABLE 2

| Seed | Rate (lb/100 seed) | Germination % | Mite Mortality (% at weeks after planting) | | | | | | |
|---|---|---|---|---|---|---|---|---|---|
| | | | 4 | 5 | 6 | 7 | 8 | 9 | 12 |
| Acid Delinted Cotton | 0 | 92 | 1 | 0 | 0 | 0 | 2 | 2 | 0 |
| | 0.125 | 98 | 99 | 89 | 99 | 92 | 100 | 52 | 0 |
| | 0.25 | 94 | 99 | 98 | 99 | 97 | 100 | 96 | 0 |
| | 0.5 | 92 | 100 | 100 | 100 | 100 | 100 | 100 | 0 |
| | 1.0 | 90 | 100 | 100 | 100 | 100 | 100 | 100 | 0 |
| | 2.0 | 84 | 100 | 100 | 100 | 100 | 100 | 100 | 100 |
| Mechanically Delinted Cotton | 0 | 90 | 1 | 0 | 0 | 1 | 1 | 3 | 0 |
| | 0.125 | 88 | 67 | 100 | 99 | 98 | 99 | 98 | 0 |
| | 0.25 | 96 | 80 | 100 | 98 | 99 | 99 | 98 | 0 |
| | 0.5 | 90 | 100 | 100 | 100 | 100 | 100 | 100 | 0 |
| | 1.0 | 70 | 100 | 100 | 100 | 100 | 100 | 100 | 100 |
| | 2.0 | 52 | 100 | 100 | 100 | 100 | 100 | 100 | 100 |
| Sorghum | 0 | 50 | — | — | — | — | — | — | — |
| | 0.5 | 40 | — | — | — | — | — | — | — |
| Sugar Beet | 0 | 56* | — | — | — | — | — | — | — |
| | 0.5 | 56* | — | — | — | — | — | — | — |

*28 days after planting

From the foregoing, the germination and long-term rate-related effectiveness of the insecticidally treated seeds are readily seen.

EXAMPLE 4

Plants grown from mechanically delinted cotton seed, treated with 3,3-dimethyl-1-methylthio-2-butanone O-methylcarbamoyloxime and untreated, became naturally infested with whitefly (*Trialeurodes vaporarioum*). To obtain data, leaves are excised 45 days after planting, placed in a covered container containing water agar, and allowed to sit for 10 days until all adult whiteflies have emerged. These are then killed with chloroform and counted. Results at various rates of application are shown in Table 3.

TABLE 3

| Rate (lb/100) | Kill (%) |
|---|---|
| 0 | 0 |
| 0.125 | 55 |
| 0.25 | 88 |
| 0.5 | 73 |
| 1.0 | 96 |

The commercial seed treatment insecticide of Example 2 exhibits zero control at the foregoing rates.

EXAMPLE 5

To demonstrate the stability of treated seeds on storage, acid delinted Delta Pine Cotton seed treated with 0.5 lb per hundred of 3,3-dimethyl-1-methylthio-2-butanone O-methylcarbamoyloxime is stored for 14 months, planted, and evaluated for insecticidal activity against two-spotted spider mites as in Example 3. Four weeks after planting, 99% kill is noted.

We claim:

1. A method of reducing insect damage to crop seeds and seedlings and improving crop yield, which method comprises treating seeds of said crop before planting with an insecticidally effective, yield improving, amount of one of the compounds 3,3-dimethyl-1-methylthio-2-butanone O-methylcarbamoyloxime and the sulfoxide and sulfone thereof.

2. A method as in claim 1 wherein the amount of compound is within the range of 0.125 to 1.0 percent by weight of the seed.

3. A method as in claim 1 wherein treatment is by application of a solution of the compound in a volatile, non-phytotoxic, solvent therefor, followed by evaporation.

4. A method as in claim 1 wherein the seed is cotton seed.

5. A method as in claim 1 wherein the compound is 3,3-dimethyl-1-methylthio-2-butanone O-methylcarbamoyloxime.

6. A method of improving crop yield, which method comprises treating seeds of said crop before planting with a yield improving amount of one of the compounds 3,3-dimethyl-1-methylthio-2-butanone O-methylcarbamoyloxime and the sulfoxide and sulfone thereof.

7. A method which comprises adherently treating seeds of a crop before planting with from 0.01 to 5.0 weight percent of one of the compounds 3,3-dimethyl-1-methylthio-2-butanone O-methylcarbamoyloxime and the sulfoxide and sulfone thereof, whereby said compound is absorbed and translocated during subsequent seedling growth.

* * * * *